United States Patent

[11] 3,597,057

| [72] | Inventor | William C. Yager |
| | | Blue Bell, Pa. |
| [21] | Appl. No. | 775,378 |
| [22] | Filed | Nov. 13, 1968 |
| [45] | Patented | Aug. 3, 1971 |
| [73] | Assignee | General Electric Company |

[54] CONTINUOUS MOTION PICTURE PROJECTOR
4 Claims, 4 Drawing Figs.

| [52] | U.S. Cl. | 352/81 |
| [51] | Int. Cl. | G03b 41/02 |
| [50] | Field of Search | 352/81, 116, 117, 118, 105, 244, 68, 42, 160 |

[56] References Cited

UNITED STATES PATENTS

| 3,053,141 | 9/1962 | Boucher | 352/116 |

FOREIGN PATENTS

| 580,937 | 11/1924 | France | 352/116 |

*Primary Examiner*—Louis R. Prince
*Assistant Examiner*—Denis E. Corr
*Attorneys*—Paul F. Prestia, Allen E. Amgott, William G. Becker, Henry W. Kaufmann, Frank L. Neuhauser and Oscar B. Waddell

ABSTRACT: A projector for producing moving images free of the frame to frame discontinuities of conventional projection systems comprises a fixed condenser lens and a fixed objective lens for respectively collimating a radiant energy signal and focusing collimated energy at a screen or image receiver. Interposed between these fixed lenses is a plurality of smaller image producers, each comprising elements of similarly arrayed pluralities of nonfixed condenser lenses, objective lenses and sequential photographic image transparencies all of which are moved in registry through the projector. Because several of these individual image producers are within the field of view of the fixed lens system at any one time, the final image produced by the fixed objective lens consists of a continuously changing combination of superimposed images from the smaller image producers. A combination of mask and particular geometric arrays of smaller image producers is used in the preferred form of the present invention to hold the number of smaller images combined into the final image constant and thereby to provide a nonvarying degree of illumination in the final image.

PATENTED AUG 3 1971  3,597,057

INVENTOR:
WILLIAM C. YAGER,
BY Paul F. Prestia
ATTORNEY

CONTINUOUS MOTION PICTURE PROJECTOR

INTRODUCTION

This invention pertains to a continuous, as opposed to intermittent, motion picture projector and more specifically a projector capable of projecting evenly illuminated moving images free of any discontinuities resulting from frame to frame separation.

BACKGROUND OF THE INVENTION

Prior art motion picture projectors intermittently project a rapid sequence of photographic transparency frames. Motion picture images produced in this way are satisfactory for most purposes especially since the interframe discontinuities are so short as to be unobservable to the human eye.

Electronic receivers of optical images produced to simulate an actual event can detect these discontinuities, however, and will therefore not respond to an optically simulated image of the event precisely as they would to the event itself. For example, in order to test an optical scorer designed to determine the accuracy of guidance systems on incoming missiles, it would be desirable to produce an optical image of an incoming missile with image continuity approaching that attainable with a zoom lens and a single transparency. Actually no such continuous moving image projectors have heretofore been available.

It is therefore an object of the present invention to provide a continuous moving image projector.

Still another object of this invention is to provide a projector capable of producing a moving image in which discontinuities and intermittency are minimized.

BRIEF DESCRIPTION OF THE INVENTION

These and other objects are met, in accordance with the present invention, by a projector having conventional illumination means, and fixed condenser and objective lens means but differing from conventional projectors by the interposition between the fixed condenser and objective of three moving strips, planarly and linearly parallel to each other, each comprised of similarly arrayed pluralities of elements. These elements on the strips nearest the fixed objective and condenser comprise smaller nonfixed objective and condenser lenses, respectively, while the elements on the middle of the three strips comprise positive photographic partly transparent image reproductions similar to conventional motion picture film frames. The size and disposition of these nonfixed or moving objective lenses, condensing lenses and negative image transparencies is such that at any given time a number of transparencies are concurrently imaged by corresponding nonfixed objective lenses, with each of the respective images superimposed on one another by the fixed objective lens means to form a single image. This of course requires that individual moving objective lenses, moving condenser lenses and transparencies remain in registry as they move through the field of view of the projector's fixed objective and condenser lens means.

In the preferred form of the invention, the transparencies and moving lenses are arrayed such that a mask disposed adjacent to the nonfixed objective lenses causes the degree of illumination of the single superimposed image to remain relatively constant irrespective of the movement of the separate image-producing elements through the projector.

While the specification concludes with claims particularly pointing out and distinctly claiming the subject matter of the present invention, this invention may be better understood from the following description, taken in conjunction with the following drawings, in which:

Figure 1:
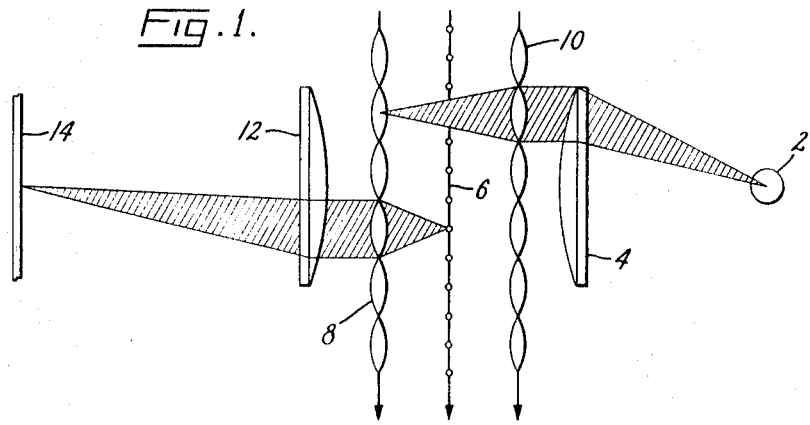
FIG. 1 is a schematic diagram of the optical elements of the continuous moving image projector of the present invention.

Referring more specifically to FIG. 1 there is shown a radiant energy source 2, a fixed condensing lens means 4 for collimating the radiant energy from source 2, a series of sequential positive photographic partly transparent image reproductions 6, a plurality of nonfixed or moving objective lens elements 8, for collimating radiant energy emanating from a point of transparencies 6, a plurality of nonfixed or moving condensing lens elements 10 for focusing collimated light from fixed condensing lens means 4 on or adjacent to moving objectives lens elements 8, a fixed objective lens means 12 for focusing collimated light from moving objective lens elements 8 on a receiver or screen 14 where the moving image is to be produced.

The sequential image transparencies 6 and the moving lens elements 8 and 10 each comprise similarly arrayed pluralities of individual transparencies and lenses mounted on planarly and linearly parallel strips which move in concert between the fixed objective and condenser lens means while each transparency is maintained in registry with a single moving objective lens element and a single moving condensing lens element. With several of the transparencies thus in the field of view of the fixed lens means at any given time, images from each of the transparencies are superimposed upon one another by fixed objective lens means 12. Thus the intermittency in this final image caused by the entry and exit of individual transparencies in the projector's field of view is minimized.

While a variety of mechanical means may be used to provide the coordinated movement of transparencies and non-fixed lenses in the continuous image projector of the present invention, only one such means is described herein. This mechanical means is schematically illustrated in FIG. 2.

Figure 2:
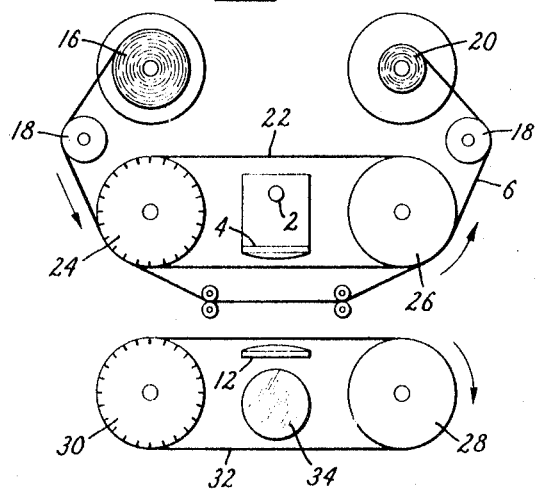
FIG. 2 is a schematic diagram of the mechanical elements in one embodiment of the present invention.

Looking more specifically then to FIG. 2 there is shown transparency or film strip 6, supply reel 16, idler rollers 18, and motive means-takeup reel 20. Belt 22 on which is mounted a plurality of nonfixed condensing lenses or elements, not illustrated, is moved in a continuous path about roller 26 and sprocket wheel 24. Engagement of the film strip 6 by sprocket wheel 24 along with the condensing lens belt 22 enables the film strip and the plurality of moving condensing lenses mounted on belt 22 to be maintained in registry as they pass between fixed condensing lens means 4 and fixed objective lens means 12. A similar roller 28 and sprocket wheel 30 causes belt 32 with a plurality of nonfixed objective lenses mounted thereon to be moved in a continuous path between fixed lens means 4 and 12 in parallel with belt 22 and the film strip 6 in registry therewith. A common power source, such an an electric motor, drives takeup reel 20 and sprocket wheels 24 and 30 through a conventional gear means which also causes the individual nonfixed objective lens elements on belt 32 to be in registry with corresponding film transparencies on strip 6 and nonfixed condensing lens elements on belt 22. The power source and conventional gear train otherwise referred to herein as registry and motive means is not shown in FIG. 2. Other elements which are shown are the radiant energy source 2 and mirror 34, mounted generally at an angle of about 45° with respect to the plane of the drawing which diverts the image producing signals projected through the fixed lens means 12 for the convenient viewing or receiving at a point disposed at some distance from the projector in a direction perpendicular to the plane of the drawing.

Figure 3:
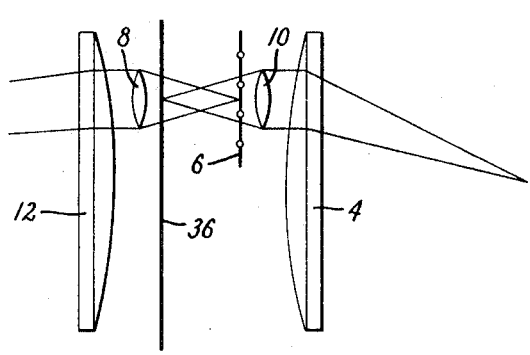
FIG. 3 is a side view of one form of constant image illumination means which is provided in the preferred form of the present invention.
Figure 4:
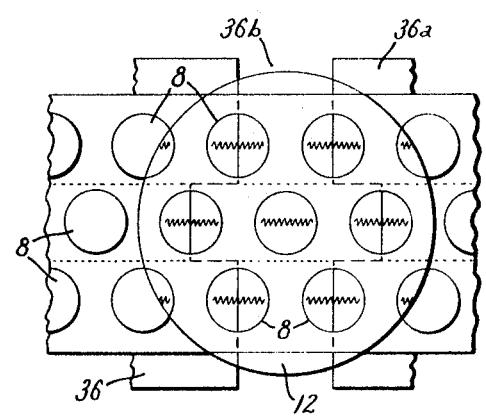
FIG. 4 is a front view of the constant image illumination means shown in FIG. 3.

Looking now to FIGS. 3 and 4 there is shown in addition to fixed lens means 4 and 12, an individual lens elements of the plurality of nonfixed lenses 8 and 10, transparencies strip 6 and a mask 36, disposed adjacent to nonfixed objective lenses 8, which mask, in combination with preselected geometric arrays of transparencies and nonfixed lens elements causes the image produced by the continuous image projector of the present invention to remain evenly illuminated regardless of the position of the film transparencies strip and lens elements in the projector.

Lenses 10 are condensers which 67 images of a source filament very close to objective lenses 8. Mask 36 is placed in the plane of those source images. FIG. 3, which shows the mask in place, and which with FIG. 4 is intended to show the functioning of the mask, emphasizes that the source images and mask are not within the plane of lenses 8 but just outside FIG. 1, which does not show the mask in place, and is intended to illustrate generally the relationship between the continuous motion picture projector and a conventional projector, simply shows condenser lenses 10 operating in a conventional manner to fill the pupils of objective lenses 8.

FIG. 1 depicts a film strip 6 situated between a linear array or strip of projection lenses 8 and a second linear array or strip of condensing lenses 10. Jointly these three elemental strips comprise a single strip of projection modules. More than one such strip may be employed side-by-side in the invention without altering its working principle. If such side-by-side strips are joined to form a single strip three lenses wide, the joined strips may then collectively be called "the strip" and the three constituent arrays may then be called "substrips.".

As is apparent in FIG. 4, mask 36 is of a stepped structure comprised of an opaque portion 36a and a transparent portion 36b which is geometrically divided into strips corresponding to substrips, indicated by dotted lines in FIG. 4, of the nonfixed lens array 8. If the transparent or open portion 36b were short in the direction of the overlying lens strip, one could say it comprised three slits, each as wide as the substrip of the lens array overlying it. But since the open portion 36b is long in the direction of the lens strip, these open sectors are not called slits but are called strips as well. In FIG. 3 the mask is shown edge-on, and therefore opaque and transparent portions are superposed and indistinguishable. Film transparencies and nonfixed or moving lens elements are mounted with fixed center-to-center distances along each of these substrips. The length of the coextensive (i.e., equally wide and paralleled) strip in the transparent portion 36b of mask 36 is equivalent to an integral multiple of the center-to-center distance on the corresponding substrips of the transparency strip and the moving lens belts. Thus a constant number of transparencies are exposed through mask 36 to fixed objective lens means 12 and the image emanating from the projector is evenly illuminated as a result thereof.

As depicted in FIG. 1, the array of small projection lenses 8 is backed by a matching array of photographic transparencies 6 and by a further array of condensing lenses 10. For every projection lens 8 there is a transparency 6 and a condenser 10, the three elements comprising a single projection module in a moving array of modules. These three element arrays, which collectively form a single array of projection modules, are held in register by mechanical means as they pass together and continuously through the space between fixed collimator 4 (condenser) and fixed collimator 12 (projection lens).

Transparencies 5 of FIG. 1 are not shown in FIG. 4 since they are not relevant to the illustrative purpose of FIG. 4. FIGS. 3 and 4 are intended to illustrate the action of the mask 36 in producing a uniform and constant level of illumination in the final image plane 14. FIG. 4 is intended to show how the shape of the mask operates to expose at all times, despite their continuous motion transverse to the axis of the projector. Because the admitted area of glowing filament is a constant, the image illumination is a constant. Strip 6, as shown in FIG. 3, is behind mask 36, and parallel to and in alignment with lens elements 8. In order to utilize more fully the pupil of fixed objective lens means 12 a preferred form of array and mask is that shown in FIG. 4 in which three elements are constantly exposed along the centerline of the image while two elements are exposed on either side thereof.

Among the various modifications of the invention described herein which will be apparent to those skilled in the art is the use of infrared radiant energy sources, with the corresponding use of infrared lens means, instead of conventional visible radiant energy means with respect to which the invention has been generally described.

What I claim as new and desire to secure by Letters Patent of the United States is:

1. A continuous, moving image projector comprising the following elements indicated by Roman numerals;
   I. a radiant energy source,
   II. a fixed condensing lens means for collimating a portion of the radiant energy from said source,
   III. a fixed objective lens means for focusing collimated radiant energy from said fixed condensing lens means, at a point on the side of said fixed objective lens means opposite said fixed condensing lens means, and
   IV. interposed between elements II and III, planarly and linearly parallel strips of similarly arrayed pluralities of
      a. sequential positive photographic partially transparent reproductions of an image,
      b. nonfixed objective lens elements interposed between elements III and IV(a), for collimating radiant energy emanating from a point on element IV (a) and incident on element IV (b),
      c. nonfixed condensing lens elements interposed between elements II and IV (a) for focusing collimated radiant energy signals from element II on element IV (b), and
      d. registry and motive means for maintaining each of said nonfixed condensing nonfixed objective lens elements while moving elements IV (a), (b) and (c) continuously in a single direction along the lengths thereof between elements II and III such that each of said image reproductions pass through said projector in sequence.

2. A projector, as recited in claim 1, wherein said registry and motive means comprises a first motor driven sprocket engaging said strip of sequential image reproductions and one of said nonfixed lens element strips and a second motor driven sprocket, the movement of which is coordinated with said first sprocket, said second sprocket engaging the other of said nonfixed lens elements strips.

3. A projector, as recited in claim 1, wherein a mask is disposed adjacent element IV (b) and said pluralities of nonfixed lens elements are arrayed such that the quantity of radiant energy from element 1 passing through said mask remains constant irrespective of the movement of said nonfixed lens elements.

4. A projector, as recited in claim 3, wherein said strips of parallel nonfixed lens elements and transparencies are geometrically divided into nonoverlapping substrips along the length thereof, individual moving lens elements being disposed with uniform center-to-center distances therebetween along the length of each of said substrips; said mask consisting of two segments, one transparent and one nontransparent to incident radiant energy from said radiant energy source, said transparent segment being geometrically divided into nonoverlapping strips each coextensive in width to corresponding substrips of said nonfixed lens and transparency strips, the length of each of said mask transparent strips equaling an integral multiple of said center-to-center distance of said corresponding substrips.

UNITED STATES PATENT OFFICE
CERTIFICATE OF CORRECTION

Patent No. 3,597,057   Dated August 3, 1971

Inventor(s) William C. Yager

It is certified that error appears in the above-identified patent and that said Letters Patent are hereby corrected as shown below:

Claim 1, Column 4, Line 34, after "condensing"

insert -- lens elements in registry with one of said image reproductions and a corresponding --

Signed and sealed this 25th day of January 1972.

(SEAL)
Attest:

EDWARD M. FLETCHER, JR.
Attesting Officer

ROBERT GOTTSCHALK
Commissioner of Patents